A. W. DAVIS.
HORSE COLLAR.
APPLICATION FILED JULY 13, 1915.

1,160,861.

Patented Nov. 16, 1915.

WITNESSES
George L. Blume.
B. Joffe

INVENTOR
Arthur W. Davis
BY
ATTORNEYS

COLUMBIA PLANOGRAPH CO., WASHINGTON, D. C.

UNITED STATES PATENT OFFICE.

ARTHUR WALTER DAVIS, OF SAVANNAH, GEORGIA.

HORSE-COLLAR.

1,160,861.  Specification of Letters Patent.  Patented Nov. 16, 1915.

Application filed July 13, 1915.  Serial No. 39,610.

*To all whom it may concern:*

Be it known that I, ARTHUR W. DAVIS, a citizen of the United States, and a resident of Savannah, in the county of Chatham and State of Georgia, have invented a new and Improved Horse-Collar, of which the following is a full, clear, and exact description.

My invention relates to a horse collar having removable pads; and the object thereof is to provide a simple, inexpensive and comfortable horse collar which is adjustable and in which the detachable pads can be easily and quickly inserted or removed when necessary.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1:
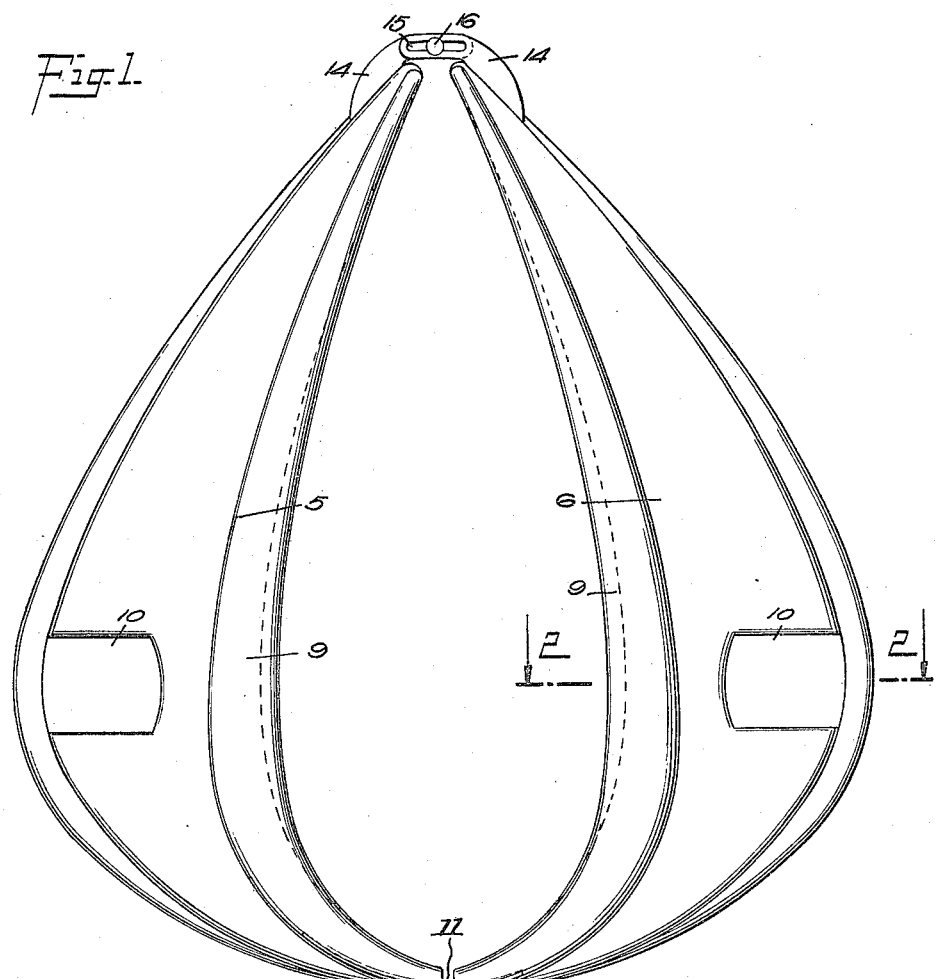
Figure 2:
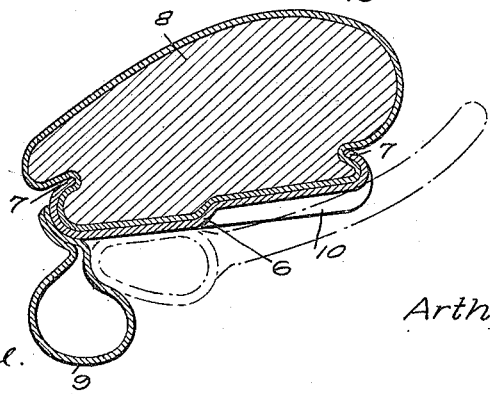

Figure 1 is a front elevation of the collar; and Fig. 2 is a cross section on line 2—2, Fig. 1.

Referring to the drawings, the collar comprises two sections 5 and 6 each dished or channeled on the inner face with the edges 7 thereof turned inwardly to retain a portion of a pad 8 forced into the dished portion of the section. The pad 8 is shaped so that it overhangs on each side the inturned edges 7 of the sections. A hollow hame rest 9 is secured to each section on the outer surface thereof adjacent the inner side of the section. A portion 10 of each section is depressed from the outer surface thereof to accommodate the tying means of the hame, as indicated in dotted lines in Fig. 2.

The lower adjacent end of the sections are locked together by a depressible, resilient catch 11 projecting out of the hame support 9 secured to the section 5 and entering the hame support 9 of the section 6 whereat a slot 12 is provided into which a head 13 of the catch enters under the resiliency of the material of which the catch is made. The upper ends of the sections 5 and 6 are made adjustable by providing extension 14 having registering slots 15 which are engaged by a clamping member 16 and whereby the relative distance between the upper ends of the sections can be adjusted and, consequently, the size of the collar varied.

From the above description it will be seen that the sections, which are preferably made out of metal, will retain the pad without any fastening, due to the inturned edges 7. The depressed portion 10 on the outer surface of the sections relieves the collar from pressure that is caused normally by the hook attached to the hame support. The overhanging sides of the pad protect the horse's shoulder from contact with the metal parts of the collar.

I claim:

1. In a horse collar, dished side sections having inturned side edges on the inner faces of the sections, a pad for each section adapted to engage the dished portion so that the inturned edges secure the pad to the section, a hame rest on the outer face of each section adjacent the inner side thereof, each of said sections having a depression on the outer face for the hook of the hame, and means connecting the ends of the sections together.

2. In a horse collar, dished side sections having inturned side edges on the inner face of the sections, a pad for each section adapted to engage the dished portion so that the inturned edges secure the pad to the section, said pad overhanging the sides of the section, a tubular hame support on the outer face of each section adjacent the inner side thereof, each of said sections having a depression on the outer surface thereof for the hook of the hame, means detachably locking the lower edges of the sections, and means adjustably connecting the upper ends of the sections.

In testimony whereof I have signed my name to this specification in the presence of two subscribing witnesses.

ARTHUR WALTER DAVIS.

Witnesses:
 O. G. RYAN,
 T. F. McBRIDE.

Copies of this patent may be obtained for five cents each, by addressing the "Commissioner of Patents, Washington, D. C."